(12) United States Patent
Chen et al.

(10) Patent No.: US 7,192,198 B1
(45) Date of Patent: Mar. 20, 2007

(54) COMPOSITE AUDIO/VIDEO OUTPUT CONNECTOR

(75) Inventors: Chin-Feng Chen, Taoyuan (TW); Jen-Tsung Wang, Taoyuan (TW)

(73) Assignee: Solteam Opto, Inc., Taoyuan (TW)

( * ) Notice: Subject to any disclaimer, the term of this patent is extended or adjusted under 35 U.S.C. 154(b) by 0 days.

(21) Appl. No.: 11/338,675

(22) Filed: Jan. 25, 2006

(30) Foreign Application Priority Data

Dec. 1, 2005 (TW) ............................... 94220894 U

(51) Int. Cl.
*G02B 6/36* (2006.01)
(52) U.S. Cl. ..................................... 385/76; 439/541.5
(58) Field of Classification Search ................... 439/79, 439/138, 541.5, 577; 385/75, 76, 77, 78, 385/79
See application file for complete search history.

(56) References Cited

U.S. PATENT DOCUMENTS

| | | | | |
|---|---|---|---|---|
| 4,969,924 A | * | 11/1990 | Suverison et al. | ............ 385/78 |
| 5,506,922 A | * | 4/1996 | Grois et al. | .................... 385/75 |
| 6,079,881 A | * | 6/2000 | Roth | ............................ 385/76 |
| 6,227,904 B1 | * | 5/2001 | Wang et al. | ............. 439/541.5 |
| 6,595,696 B1 | * | 7/2003 | Zellak | .......................... 385/72 |
| 6,796,719 B2 | * | 9/2004 | Zhu et al. | ...................... 385/76 |
| 6,921,291 B2 | * | 7/2005 | Shih | ........................ 439/541.5 |
| 7,029,329 B1 | * | 4/2006 | Huang | ........................ 439/607 |

\* cited by examiner

*Primary Examiner*—Thanh-Tam Le
(74) *Attorney, Agent, or Firm*—Troxell Law Office PLLC

(57) ABSTRACT

A composite audio/video output connector comprises an insulating base, a first connecting port with a flat connecting surface and a second connecting port with a transversally extended inserting post disposed at and its upper and middle section of the base respectively, and the lower base includes a third connecting port comprising an optical fiber sheathing base, a one-way doorstop with a U-shape dual axial springs for embedding the optical fiber sheathing base into a base chamber at the lower section of the base; a front casing corresponding to each connecting port to form a slot and a folded edge formed on each of the four sides of a panel for connecting the front edge of the base; and a sealed cover having pin holes for extending the pins of a metal terminal and an optical element and engaging the sealed cover to an opening at the bottom of the base.

6 Claims, 5 Drawing Sheets

COMPOSITE AUDIO/VIDEO OUTPUT CONNECTOR

BACKGROUND OF THE INVENTION

1. Field of the Invention

The present invention relates to a composite audio/video output connector, and more particularly to a composite audio/video output connector that integrates optical fiber signals, images, and audio/video signals.

2. Description of the Related Art

In general, traditional audio/video device or computer systems come with an audio/video input/output port for plugging various different kinds of signal connectors to facilitate the input and/or output of different audio/video signals. To simplify the process of installing different connecting port modules, manufacturers generally integrate several different signal connecting ports into a single member to lower the manufacturing cost and simplify the installation process.

R.O.C. Pat. Publication No. M274662 discloses an improved 3-in-1 optical fiber audio/video output connector which is an inserting structure comprising the following elements: a three-way base having a first connecting port, a second connecting port, and a third connecting port disposed at the front side; a first connecting port installed at the top of the base and having a parallel connecting surface disposed at the front surface of the base; a second connecting port installed at the middle of the base and forming a transversal pillar inserting end protruded forward from the second connecting port; a third connecting port installed at the bottom of the base, and the third connecting port is an optical fiber connector for plugging an external optical fiber terminal; a two-way doorstop installed at the inlet of an inserting opening disposed at the front of the third connecting port; a bottom board embedded into the bottom of the base and having a plurality of pins disposed at the bottom of the bottom board and vertically penetrated into the bottom board; and a metal casing engaged into the front end of the base and the upper, middle, and lower frame holes of the front end of the metal casing include a first connecting port, a second connecting port, and a third connecting port respectively.

In the prior art, three different connecting ports are integrated into a 3-in-1 base to achieve the expected function of integrating the audio/video signals, but the significant shortcomings reside on that: (1) The prior art adopts a two-way doorstop (sideway opening door panel), and thus the applied force may be uneven and the two-way doorstop may not work properly due to the single torque of the spring. As a result, the door may be stuck, and thus loosing the dustproof effect; and (2) The bottom of the base of the prior art is embedded by a bottom board, which may create a gap between the bottom of the base and an optical fiber connecting port. When a circuit board having the optical fiber connecting port is passed through a soldering furnace, the soldering flux or foreign matters will enter into the optical fiber connecting port through the gap, and thus affecting the signal transmission and receiving of the optical element and causing signal distortions, interference, and instability.

SUMMARY OF THE INVENTION

In view of the shortcomings of the prior art, the inventor of the present invention based on years of experience in the design and sale of optoelectronic products to perform extensive researches and experiments to overcome the serious shortcomings that the doorstop of the third connecting port of foregoing 3-in-1 optical fiber AV output connector is stuck easily and the external foreign matters may enter into the connector easily, and finally invented a composite audio/video output connector in accordance with the present invention.

It is a primary objective of the present invention to provide a composite audio/video output connector comprising a base which is an insulating base and at its upper and lower sections separately having a hole, a groove, and a tenon according to a desired connecting port for embedding and fixing a metal terminal, and respectively having a first connecting port with a straight and flat connecting and a second connecting port with a transversally extended inserting post, and the lower section of the base further includes a third connecting port comprising: an optical fiber sheathing base, having a one-way doorstop with a U-shaped dual axial springs axially coupled to a front end of the optical fiber sheathing base for embedding the optical fiber sheathing base into a base chamber disposed at the lower section of the base; a front casing, being a metal frame and forming a frame slot corresponding to each connecting port and a folded edge disposed inwardly towards each of four sides of a panel and coupled to the front edge of the base; and a sealed cover, being a board having pin holes for allowing pins of a terminal and an optical element to be extended and engaging the sealed cover to an opening disposed at the bottom of the base.

The secondary objective of the present invention is to provide a composite audio/video output connector wherein the first connecting port is an S-terminal port and the second connecting port is an AV terminal port.

A further objective of the present invention is to provide a composite audio/video output connector, wherein the doorstop connects both sides of the pivotal axle to the axial spring on both sides of a U-shape link rod. Further, the front casing includes a latch hole separately disposed on both left and right sides of the folded edge to facilitate latching the latch tenon at the corresponding side of the base.

Another further objective of the present invention is to provide a composite audio/video output connector, wherein the sealed cover includes a plurality of latch tenons protruded from the top of the sealed cover for latching the opening at the bottom of the base. Further, a plurality of latch hooks is protruded downward from the bottom of the sealed cover and latched to holes on a circuit board.

DETAILED DESCRIPTION OF THE PREFERRED EMBODIMENTS

Figure 1:
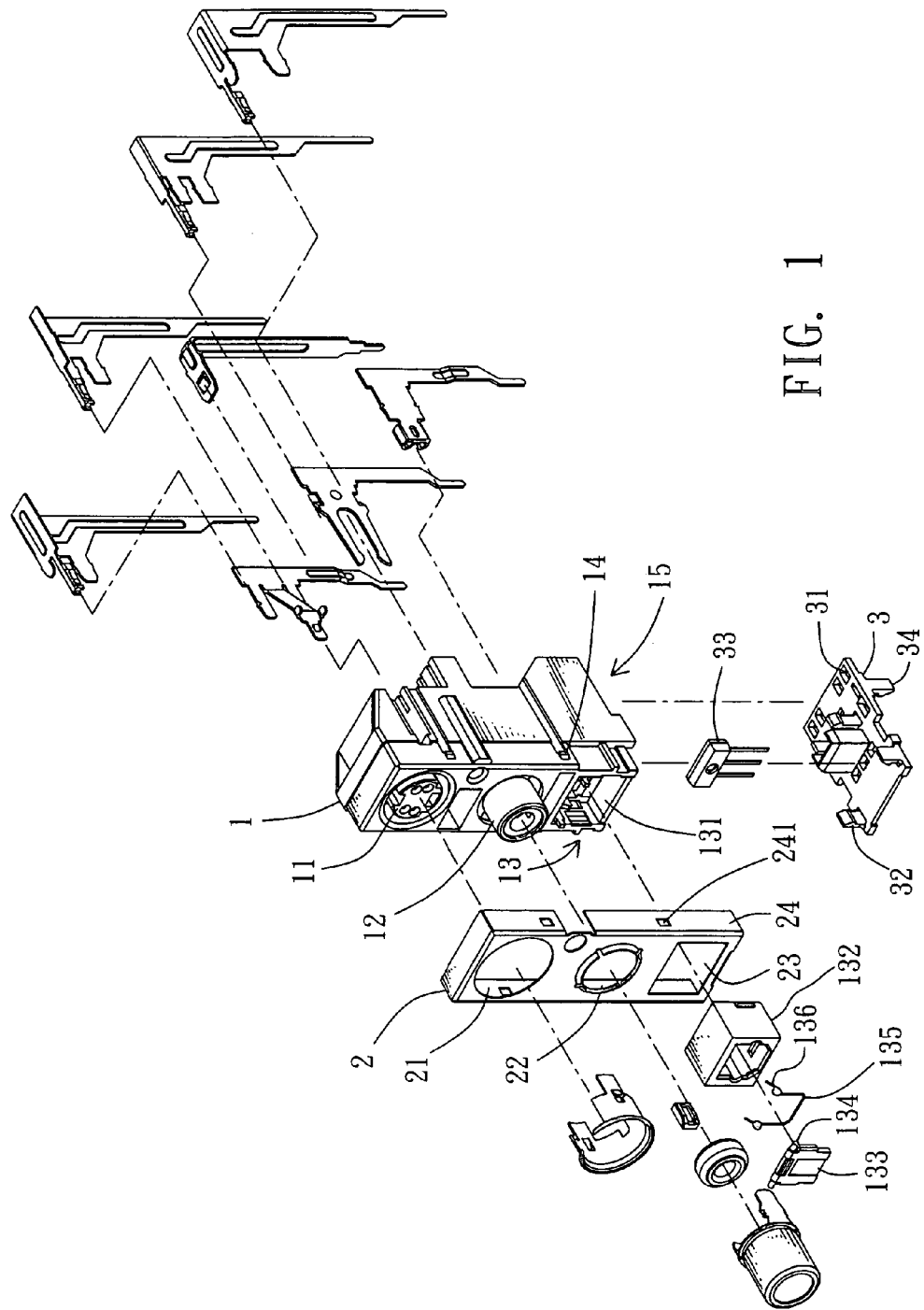
FIG. 1 is an exploded view of a composite audio/video output connector of the present invention.
Figure 2:
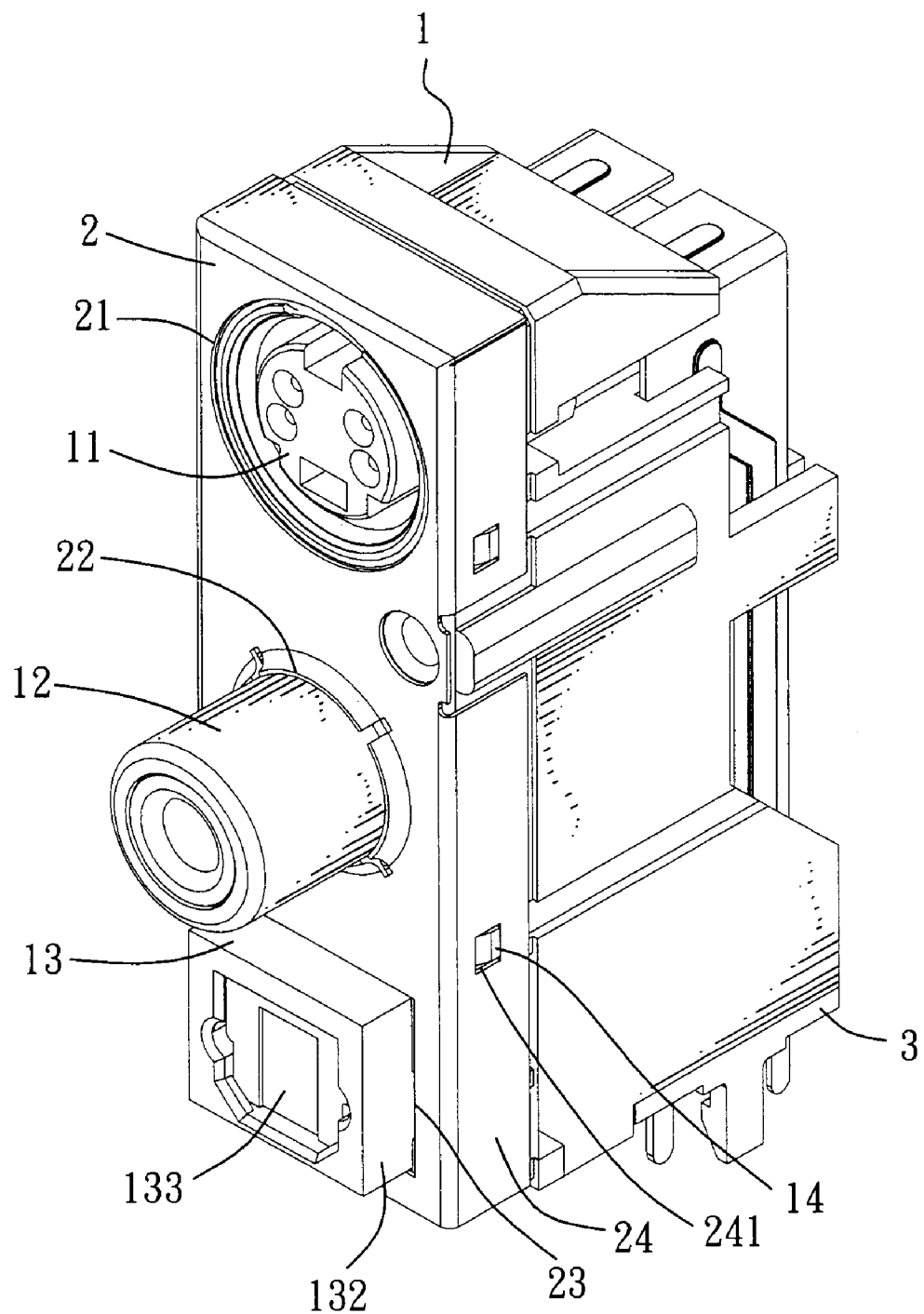
FIG. 2 is a perspective view of a composite audio/video output connector of the present invention.
Figure 3:
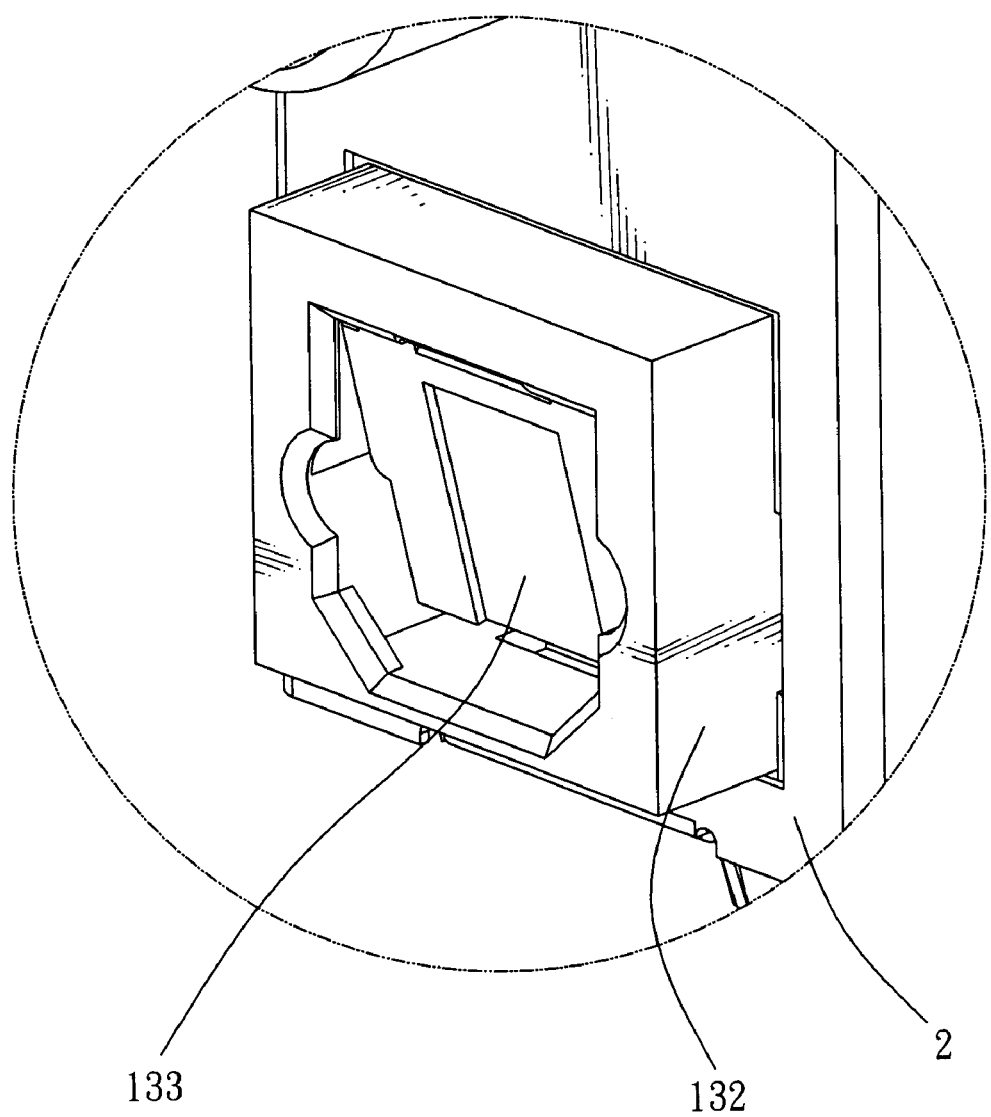
FIG. 3 is a schematic view of an enlarged portion of a third connecting port of the present invention.

Referring to FIGS. 1 to 5, a composite audio/video output connector of the invention comprises a base 1, a front casing 2, and a sealed cover 3.

The base 1 is an insulating base having a hole, a groove, a tenon disposed at the upper, middle, and lower sections according to the desired connecting port for inserting and fixing related metal terminal for transmitting audio or video signals, but these are prior arts and thus will not be described here. The base 1 forms a first connecting port 11 and a second connecting port 12 at the upper and middle sections of the base 1, wherein the first connecting port 11 has a straight and flat surface, such as a S-terminal port for inserting a connector with a S-terminal and transmitting video signals, and the second connecting port 12 has a transversally extended inserting post such as an AV-terminal port for inserting a connector with an AV terminal and transmitting audio or video signals.

Figure 4:
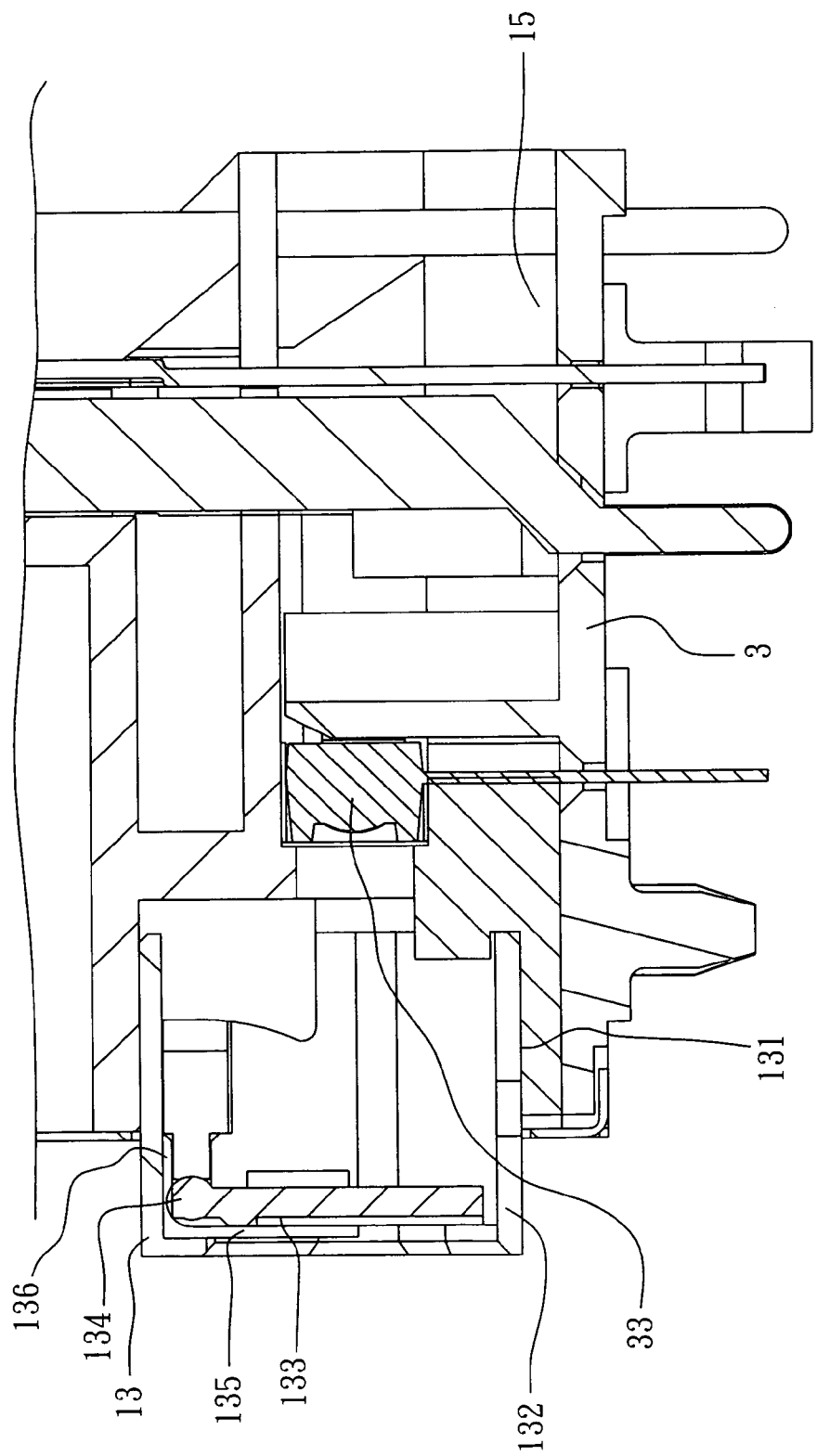
FIG. 4 is a cross-sectional view of an enlarged portion of a third connecting port of the present invention.

The base 1 at its bottom forms a third connecting port 13 such as an optical fiber connector having a base chamber 131. Now, an optical fiber sheathing base 132 has its front end axially coupled to a one-way doorstop 133, and a pivotal axle 134 disposed separately on both sides and coupled to the axial spring 136 on both sides of a U-shape link rod 135 and axially coupled to the front end of the optical fiber sheathing base 132, such that the doorstop 133 corresponding to the optical fiber sheathing base 132 could be opened or shut to embed the optical fiber sheathing base 132 into the base chamber 131 to form a third connecting port 13 as shown in FIG. 4.

The front casing 2 is a metal board stamped and bent into a metal frame and forms a frame slot 21, 22, 23 corresponding to each connecting port and a folded edge 24 disposed inwardly towards each of the four sides of a panel for connecting the front edge of the base 1, so as to expose each connecting port. The left and right sides of the folded edge 24 separately include a latch hole 241 for securely latching a latch tenon 14 disposed at a corresponding side of the base 1.

Figure 5:
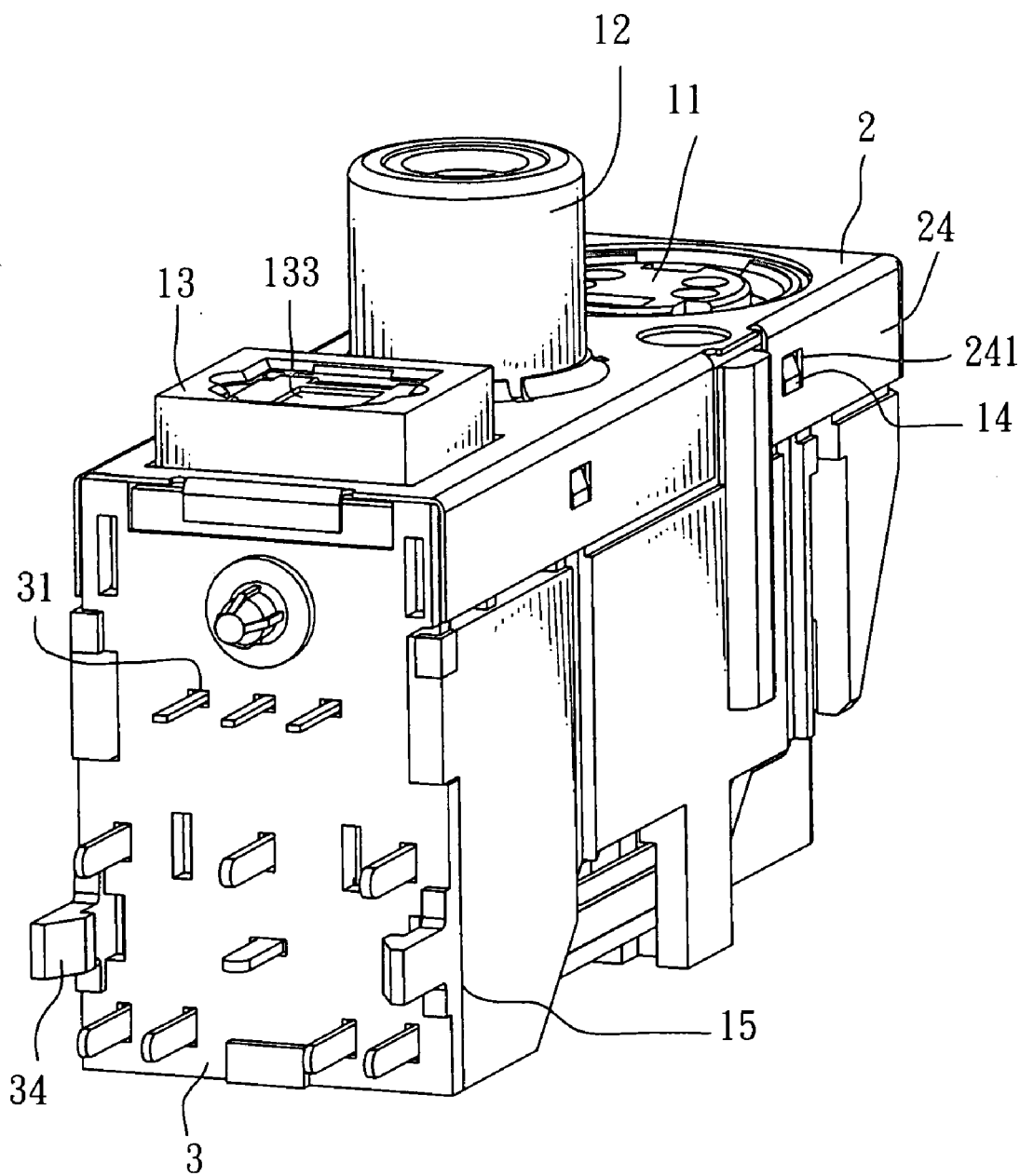
FIG. 5 is a perspective bottom view of the present invention.

The sealed cover 3 is a board having a pin hole 31 for extending a pin of each metal terminal, and an optical element 33 is placed and fixed at the rear side of the optical fiber sheathing base 132 in the third connecting port 13, and its pin passes through the pin hole 31. A plurality of latch tenons 32 is protruded upwardly for latching an opening 15 at the bottom of the base 1 to seal the opening 15 completely by the integrally formed sealed cover 3 (as shown in FIG. 5), so as to prevent foreign matters such as soldering flux from entering into the third connecting port 13 through the gaps. Further, the sealed cover 3 includes a plurality of latch hooks 34 protruded from its bottom for latching a hole on a circuit board to facilitate the soldering process.

With the implementation of the present invention, the serious shortcomings of the prior art can be improved greatly. For example, the doorstop of the third connecting port of the invention is one-way and upwardly opened and adopts the design of a U-shape dual axial spring that allows users to apply a force evenly. In other words, the optical fiber connector can be inserted into a proper position without getting stuck. Further, the sealed cover is integrally formed, and thus when it is engaged with the base, there is no gap produced, but the sealed cover provides the fully sealed effect, and thus foreign matters such as soldering flux and slag will not attach on the optical element, and signals are prevented from being distorted, interfered, or unsettled. The present invention provides a novel solution for the products of this sort.

In summation of the above description, the present invention herein enhances the performance than the conventional structure and further complies with the patent application requirements and is submitted to the Patent and Trademark Office for review and granting of the commensurate patent rights.

While the invention has been described by means of specific embodiments, numerous modifications and variations could be made thereto by those skilled in the art without departing from the scope and spirit of the invention set forth in the claims.

What is claimed is:

1. A composite audio/video output connector for a circuit board comprising:
   a) a base being an insulating base having holes, grooves, and tenons for a plurality of connecting ports for embedding and fixing metal terminals to upper, middle, and lower sections thereof, the base having:
      i) a first connecting port located in the upper portion and having a straight and flat connecting surface;
      ii) a second connecting port located in the middle portion and having a transversely extending inserting post;
      iii) a third connecting port located in the lower portion and having a base chamber, an optical fiber sheathing base connected to the base chamber, a one-way doorstop and a U-shaped link rod pivotally connected to the optical fiber sheathing base, the U-shaped link rod having an axial spring located at each of two ends thereof; and
      iv) a bottom opening;
   b) a front casing being a metal frame having three frame slots corresponding to each of the first, the second, and the third connecting ports, and a plurality of folded edges located on sides thereof, the front casing is connected to a front edge of the base; and
   c) a sealed cover being a board sealing the bottom opening of the base and having an optical element and a plurality of pin holes, the metal terminals and pins of the optical element are inserted into the plurality of pin holes.

2. The composite audio/video output connector according to claim 1, wherein the first connecting port is a S-terminal port and the second connecting port is an AV terminal port.

3. The composite audio/video output connector according to claim 1, wherein the one-way doorstop has a pivotal axle extending outwardly from each of two opposing sides thereof, one pivotal axle is inserted through each axial spring.

4. The composite audio/video output connector according to claim 1, wherein the base has a plurality of latch tenons located on opposing sides thereof, the front casing has a plurality of latch holes located on opposing folded edges of the plurality of folded edges, one of the plurality of latch tenons is inserted into each of the plurality of latch holes.

5. The composite audio/video output connector according to claim 1, wherein the sealed cover has a plurality of latch tenons protruding upwardly from a top thereof for connecting the sealed cover to the base.

6. The composite audio/video output connector according to claim 1, wherein the sealed cover has a plurality of latch hooks protruding downwardly from a bottom thereof for connecting the sealed cover to the circuit board.

* * * * *